(12) United States Patent
Gschwind et al.

(10) Patent No.: US 9,323,530 B2
(45) Date of Patent: Apr. 26, 2016

(54) CACHING OPTIMIZED INTERNAL INSTRUCTIONS IN LOOP BUFFER

(75) Inventors: Michael K. Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1065 days.

(21) Appl. No.: 13/432,512

(22) Filed: Mar. 28, 2012

(65) Prior Publication Data

US 2013/0262822 A1 Oct. 3, 2013

(51) Int. Cl.
*G06F 9/30* (2006.01)
*G06F 9/38* (2006.01)

(52) U.S. Cl.
CPC .......... *G06F 9/30145* (2013.01); *G06F 9/3017* (2013.01); *G06F 9/381* (2013.01); *G06F 9/384* (2013.01)

(58) Field of Classification Search
CPC ... G06F 9/30145; G06F 9/3017; G06F 9/381; G06F 9/384
See application file for complete search history.

(56) References Cited

U.S. PATENT DOCUMENTS

| | | | |
|---|---|---|---|
| 6,658,578 B1 | 12/2003 | Laurenti et al. | |
| 7,111,155 B1 | 9/2006 | Anderson et al. | |
| 7,356,673 B2 | 4/2008 | Altman et al. | |
| 7,398,372 B2 | 7/2008 | Samra et al. | |
| 7,571,305 B2 * | 8/2009 | Piry et al. | 712/241 |
| 7,694,084 B2 | 4/2010 | Raghavan et al. | |
| 8,082,430 B2 * | 12/2011 | Valentine et al. | 712/245 |
| 2002/0178350 A1 | 11/2002 | Chung et al. | |
| 2004/0078608 A1 | 4/2004 | Kanapathippillai et al. | |
| 2006/0242394 A1 | 10/2006 | Uchiyama | |
| 2009/0055589 A1 * | 2/2009 | Croxford et al. | 711/119 |
| 2009/0113191 A1 * | 4/2009 | Hall et al. | 712/241 |

FOREIGN PATENT DOCUMENTS

| | | |
|---|---|---|
| CN | 101872295 A | 10/2010 |
| CN | 1425153 A | 6/2015 |

OTHER PUBLICATIONS

Rosner et al.; "Power Awareness through Selective Dynamically Optimized Traces"; IEEE; 2004.*
Chinese Office Action for Chinese Application Serial No. 201310098530.X, Mailed Apr. 1, 2015; 7 pages.
Kim et al., "Implementing Optimizations at Decode Time", IEEE, 2002; 12 pages.
U.S. Appl. No. 14/090,318; Non-Final Office Action, filed Nov. 26, 2013; Date Mailed: Jul. 17, 2015; 19 pages.

* cited by examiner

*Primary Examiner* — Benjamin Geib
(74) *Attorney, Agent, or Firm* — Cantor Colburn LLP; William A. Kinnaman, Jr.

(57) ABSTRACT

Embodiments of the invention relate to a computer system for storing an internal instruction loop in a loop buffer. The computer system includes a loop buffer and a processor. The computer system is configured to perform a method including fetching instructions from memory to generate an internal instruction to be executed, detecting a beginning of a first instruction loop in the instructions, determining that a first internal instruction loop corresponding to the first instruction loop is not stored in the loop buffer, fetching the first instruction loop, optimizing one or more instructions corresponding to the first instruction loop to generate a first optimized internal instruction loop, and storing the first optimized internal instruction loop in the loop buffer based on the determination that the first internal instruction loop is not stored in the loop buffer.

8 Claims, 10 Drawing Sheets

CACHING OPTIMIZED INTERNAL INSTRUCTIONS IN LOOP BUFFER

BACKGROUND

The present invention relates generally to internal instruction optimization, and more specifically, to caching optimized internal instructions in a loop buffer.

Processors access internal instructions from memory and execute the internal instructions to control operations of a computing device and to cause the computing device to perform particular functions, such as data processing, display, calculation, data storage, data output, and other functions. Different types of memory, such as non-volatile memory, ROM, RAM, or flash memory may store large quantities of internal instructions, but may operate at slower clock speeds than the processor. Higher-speed buffers and/or cache memory may be used to store smaller numbers of internal instructions than main memory and may be accessed directly by the processor at higher speeds than main memory to improve a speed of the computing device.

SUMMARY

According to one embodiment of the present disclosure, a computer program product for implementing an internal instruction loop buffer includes a tangible storage medium readable by a processing circuit and storing internal instructions for execution by the processing circuit for performing a method. The method includes determining, by a processor, that a first internal instruction corresponds to an internal instruction loop, determining that the internal instruction loop is stored in a loop buffer, and optimizing one or more internal instructions of the internal instruction loop and storing a resulting first optimized internal instruction loop in the loop buffer based on a determination that the internal instruction loop is not stored in the loop buffer.

According to another embodiment of the present disclosure, a computer system for storing an internal instruction loop in a loop cache includes a loop buffer configured to store one or more internal instruction loops and a processor. The computer system is configured to perform a method including detecting a beginning of a first internal instruction loop, determining that the first internal instruction loop is not stored in the loop buffer, and fetching the first internal instruction loop, optimizing one or more internal instructions in the first internal instruction loop to generate a first optimized internal instruction loop, and storing the first optimized internal instruction loop in the loop buffer based on the determination that the first internal instruction loop is not stored in the loop buffer.

According to yet another embodiment of the present disclosure, a computer implemented method includes detecting the beginning of a first internal instruction loop, detecting that the first internal instruction loop is not stored in a loop buffer, and optimizing the first internal instruction loop, storing the optimized first internal instruction loop in the loop buffer, and executing the first internal instruction loop.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
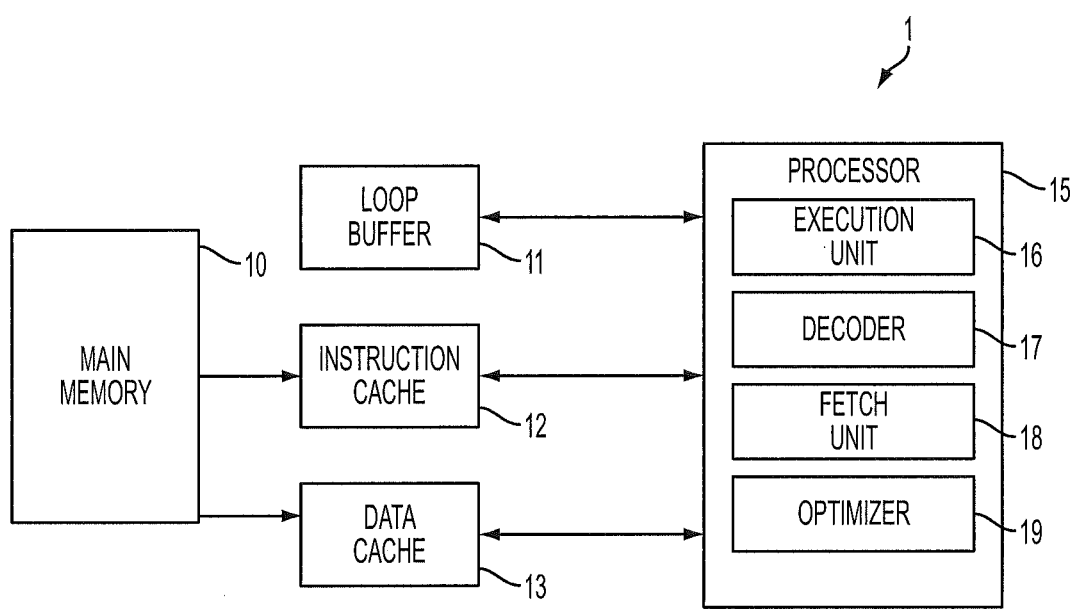
FIG. 1 depicts a block diagram of a system for caching optimized internal instructions according to an embodiment of the present disclosure.

With reference to FIG. 1, a system 1 for caching optimized instructions according to an embodiment of the present disclosure. The system 1 includes main memory 10 to store instructions and data. A processor 15 accesses the instructions and data from main memory 10. A fetch unit 18 fetches instructions and/or from an instruction cache 12 and a data cache 13. The processor 15 includes a fetch unit 18 to fetch instructions and/or data from the memory 10, the instruction cache 12, or the data cache 13. The processor 15 further includes a decoder 17 to decode the instructions fetched by the fetch unit 18 and an execution unit 16 to execute the instructions decoded by the decode unit 17.

In embodiments of the present disclosure, the processor 15 may further include an optimization unit 19, also referred to as optimizer 19, for optimizing instructions. The optimized instructions may be the decoded operations decoded by the decoder 17. In embodiments of the present disclosure, instructions stored in the main memory 10, instruction cache 12, and data cache 13 may include either machine instructions or internal instructions that are generated based on the machine instructions.

Figure 2:
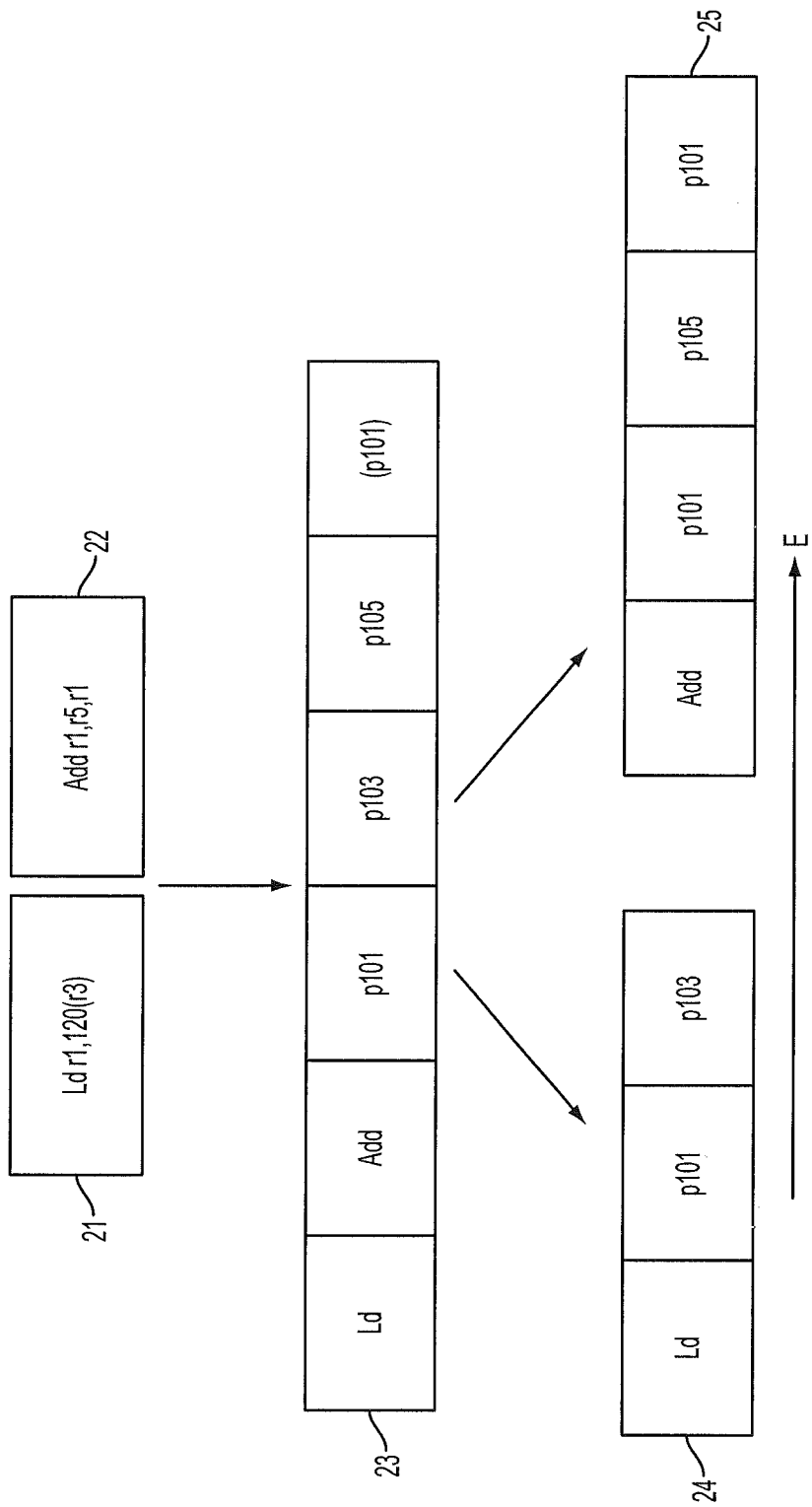
FIG. 2 depicts a block diagram of optimizing internal instructions according to an embodiment of the present disclosure.

FIG. 2 depicts a block diagram of optimizing machine instructions according to an embodiment of the present disclosure. First and second machine instructions 21 and 22 are analyzed to determine whether they may be optimized. For example, in one embodiment, machine instructions are determined to be eligible for optimization if a second machine instruction has an operand location that is the same as a target destination of a first machine instruction. In another embodiment, machine instructions are determined to be eligible for optimization if a second machine instruction has a same operand location and target destination as a target destination of a first machine instruction.

In one embodiment of the present disclosure, the first machine instruction 21 is a memory load instruction and the second machine instruction 22 is a data processing instruction to process data located at a target destination of the memory load instruction. For example, the first and second machine instructions 21 and 22 may be RISC-compatible internal instructions. Referring to FIG. 2, the first machine instruction 21 is configured to control a processor to load a value into register r1 based on an address at register r3 and a constant, 120. The second internal instruction is configured to control a processor to load a value into register r1 based on the sum of the contents of registers r1 and r5.

When it is determined that the first and second machine instructions 21 and 22 are eligible to be optimized, the first and second machine instructions 21 and 22 are merged to form the optimized internal instruction 23. The optimized internal instruction 23 includes internal instruction portions corresponding to each of the first and second machine instructions 21 and 22. In particular, the optimized internal instruction 23 includes internal instructions to load to physical location 101, corresponding to register r1, a value corresponding to an address at physical location p103, corresponding to the register r3 plus the constant, 120. The optimized internal instruction 23 further includes internal instructions to add the contents of physical location p105, corresponding to register r5, with the contents of physical location p101, corresponding to the register r1, and to store the contents in physical location p101.

For example, in embodiments in which the first and second machine instructions 21 and 22 are eligible for optimization only when the second machine instruction 22 accesses and replaces the data from the same register as the destination register of the first machine instruction 21, the optimized internal instruction 23 may omit the operand data p101 (omitted data indicated by parentheses) at the end of the second internal instruction portion of the optimized internal instruction 23, thereby reducing a size of the optimized internal instruction 23. Physical locations are obtained for logical register names by known register renaming techniques.

Although one embodiment of an optimized internal instruction 23 is illustrated in FIG. 2, it is understood that embodiments of the present disclosure encompass optimized internal instructions having different contents and organization. For example, in one embodiment, a separate data location may be provided for the destination or register of the second operation of the optimized internal instruction. In another embodiment, a separate data location may be provided for each operand of the second operation of the optimized internal instruction 23, regardless of whether the operand is the same as the target destination or register of the first internal instruction portion.

In one embodiment of the present disclosure, the optimized internal instruction 23 is executed by executing two separate internal instructions 24 and 25. A first internal instruction 24 may correspond to the first machine instruction 21, and a second internal instruction 25 may correspond to the second machine instruction 22. The first and second internal instructions 24 and 25 are executed in the same order as the first and second machine instructions 21 and 22 would have been executed based on the original positions of the first and second machine instructions 21 and 22 in an instruction stream, as indicated by the arrow E.

In one embodiment, executing the first and second internal instructions 24 and 25 includes dividing the optimized internal instruction 23 into separate internal instructions 24 and 25 and executing each of the separate internal instructions 24 and 25 in separate operation cycles. In another embodiment, executing the first and second internal instructions 24 and 25 includes executing the optimized internal instruction 23 twice, executing the first portion of the optimized internal instruction 23 that corresponds to the first internal instruction 24 the first time the optimized internal instruction 23 is optimized, and executing a second portion of the optimized internal instruction 23 corresponding to the second internal instruction 25 the second time the optimized internal instruction 23 is executed.

In one embodiment, one or both of an operand source location and a destination location is omitted from the second portion of the optimized internal instruction 23 corresponding to the second internal instruction 25, and a processor supplies the destination location of the first portion of the optimized internal instruction 23 corresponding to the first internal instruction 24 as one or both of the omitted operand source location and destination location of the second internal instruction 25.

In one embodiment of the present disclosure, optimizing the internal instructions may include determining that a target destination of a first internal instruction is the same as an operand source location of a second internal instruction that is configured to be executed consecutively after the first internal instruction. The second internal instruction may be replaced by another internal instruction having an operand source location different than the target destination of the first internal instruction to permit the first internal instruction and the another internal instruction to be executed in parallel.

Figure 3:
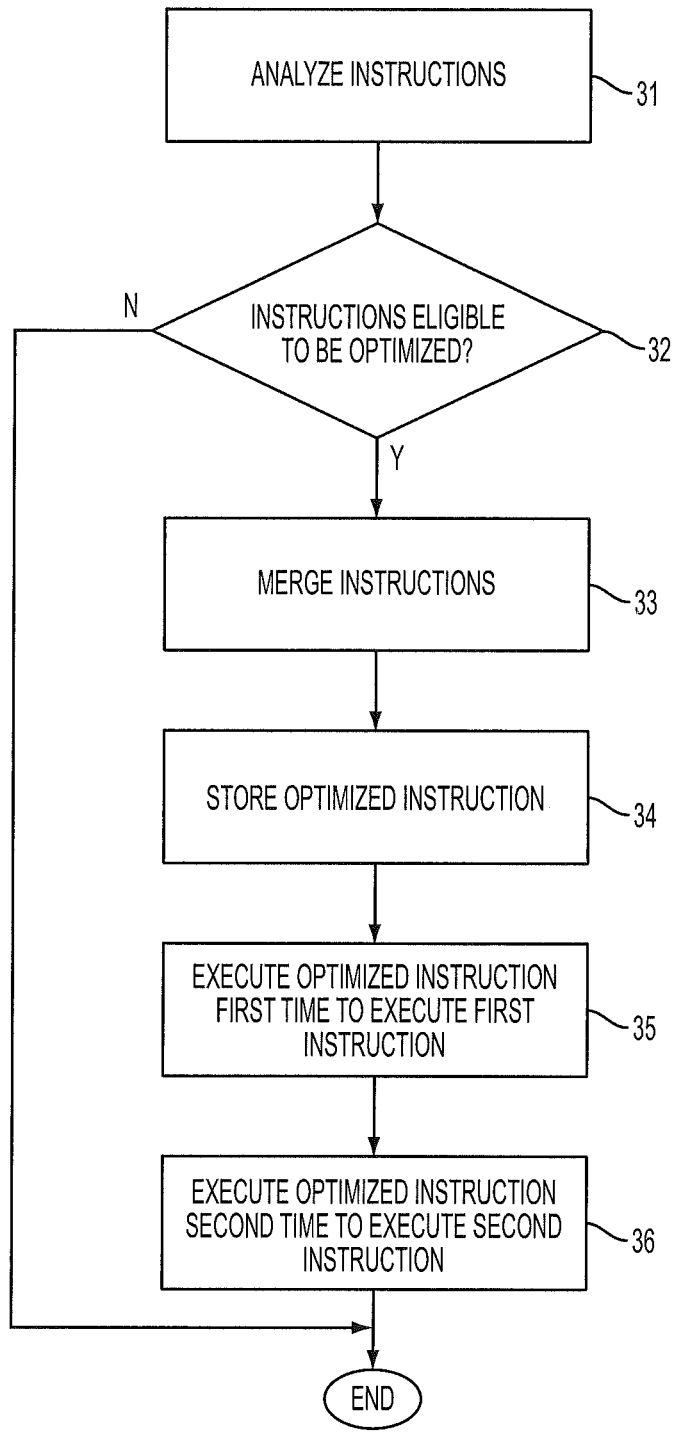
FIG. 3 depicts a process flow for optimizing instructions according to an embodiment of the present disclosure.

FIG. 3 illustrates a method of optimizing instructions according to an embodiment of the present disclosure. The method may be performed in a system 1 having a configuration illustrated in FIG. 1, or in any other system configured to perform the method. It is understood that while blocks 31-36 are illustrated in FIG. 3, embodiments of the present disclosure encompass methods in which one or more of the blocks 31-36 is omitted or modified, or in which additional blocks are added.

Figure 4:
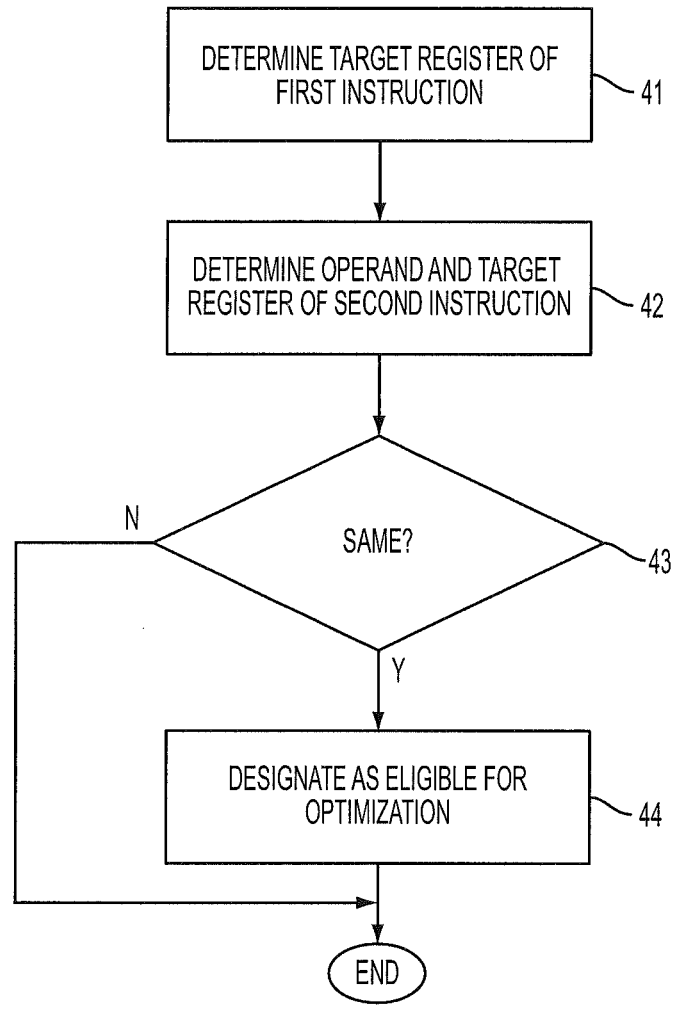
FIG. 4 depicts a process flow for determining instruction eligibility for optimization according to an embodiment of the present disclosure.

In block 31, a plurality of instructions is analyzed for optimization 31. The analyzed instructions may include machine instructions or internal instructions generated based on the machine instructions. FIG. 4 illustrates one embodiment of determining whether instructions are eligible to be optimized. It is understood that while blocks 41-44 are illustrated in FIG. 4, embodiments of the present disclosure encompass methods in which one or more of the blocks 41-44 is omitted or modified, or in which additional blocks are added. In block 41, a target destination or register of a first instruction is determined. In block 42, a location of an operand and a target destination or register of a second instruction is determined.

In block 43, it is determined whether the target destination or register of the first and second instructions is the same, and whether the target destination or register is the same as the location of an operand of the second instruction. If so, in block 44 the instructions are designated as being eligible for optimization. If the first and second internal instructions are not eligible for optimization based on the analysis of block 43, then the process ends.

Although the embodiment of FIG. 4 describes determining whether instructions are eligible for optimization based on a destination register of the operations, other criteria may determine whether instructions are eligible for optimization. In particular, instructions may be eligible for optimization any time an accurate execution of the second instruction depends upon the outcome of the first instruction. For example, if a second operation uses data in a register written to by a first operation and writes to that register, then performing the second operation prior to performing the first operation may generate a faulty result in the second operation. Since the second operation depends upon the execution of the first operation, the operations may be eligible to be optimized.

In one embodiment, the first and second instructions are adjacent to each other in an instruction stream, such that one would be executed immediately after the other if executed in order. In one embodiment, only the source of the operand of the second instruction is compared to the target register or destination of the first instruction.

In another embodiment, only the target destination or register of the second instruction is compared to the target register or destination of the first instruction.

In one embodiment, the operands locations and target destinations or registers of the instructions in the instruction stream may be analyzed, and the first and second instructions may be determined to be eligible for optimization when no instruction between the first instruction and the second instruction in the instruction stream writes to an operand location accessed by the second instruction, and no instruction between the first instruction and the second instruction in the instruction stream reads from the target destination or register of the first instruction.

In one embodiment, a determination may be made whether the instructions are of types that are eligible to be combined. For example, in one embodiment with multiple queues, instructions may only be combined if they are issued from the same queue. Thus, in one embodiment, vector instructions and floating point instructions may be combined with one another, and integer instruction may be combined, but not integer and vector instructions. Similarly, issue logic may restrict other combinations of instructions.

Referring again to FIG. 3, if it is determined in operation 32 that the analyzed instructions are eligible to be optimized, the instructions are merged in operation 33 to form one optimized internal instruction including the instruction information of each of the analyzed instructions. The optimized internal instruction may be arranged according to predetermined programming parameters such that an instruction executing device recognizes the first portion of the optimized internal instruction as being a first instruction to be executed first, and the second portion of the optimized internal instruction as being a second instruction to be executed second.

In one embodiment, the analyzed instructions are machine instructions, and merging the instructions includes performing a register rename process and generating internal instructions corresponding to the machine instructions to generate the optimized internal instruction. In another embodiment, the analyzed instructions may be internal instructions, so that merging the instructions does not require converting the instructions into internal instructions prior to generating the optimized internal instruction.

In operation 34, the optimized internal instruction is stored as one internal instruction. For example, the optimized internal instruction may be stored in only one slot in the loop buffer 11 or the instruction cache 12.

In one embodiment, generating the optimized internal instruction 23 is performed in conjunction with performing register renaming on the named logical register operands in the internal instructions of the optimized internal instruction 23. In one embodiment a register renaming process is performed by allocating only a single target rename register to store the result of the first internal instruction and the second internal instruction of the optimized internal instruction 23, where the target register of the first internal instruction is the same as the target register of the second internal instruction, or where the target register of the first internal instruction is the same as the source register of an operand of the second internal instruction.

In at least one embodiment, when the second internal instruction having been combined into an optimized internal instruction reads the result of the first internal instruction of the optimized internal instruction 23, the common target register is not named as a source register and represents an additional implicit operand that is not stored in the optimized internal instruction 23 separately as a source operand, but which is supplied as a source operand to the second internal instruction when the second internal instruction is executed, or when a portion of the optimized internal instruction 23 corresponding to the second internal instruction is executed.

In operation 35, a first internal instruction of the optimized internal instruction is executed. A processor may read the optimized internal instruction and may recognize first and second internal instructions located within the optimized internal instruction. The first and second internal instructions may be arranged in such a way as to have an order of execution recognized by the processor. For example, in one embodiment, a code corresponding to a first internal instruction may be located in more significant bits relative to a code corresponding to a the second internal instruction.

In operation 36, the second internal instruction of the optimized internal instruction is executed after executing the first instruction. In embodiments of the present disclosure, the first and second internal instructions are executed in the same order in which the internal instructions were arranged in an instruction stream prior to being merged into the optimized internal instruction. For example, if the first internal instruction is upstream from the second internal instruction, indicating that the first internal instruction would be executed first if the internal instructions were executed in order, then the first internal instruction would be executed first in the optimized internal instruction.

In one embodiment, first and second machine instructions are optimized to generate the optimized internal instruction, and the first and second internal instructions are executed in blocks 35 and 36 by generating first and second internal instructions from the optimized internal instruction corresponding to the first and second machine instructions and executing the first and second internal instructions separately, such as in separate operation cycles. In another embodiment, first and second internal instructions are optimized to form the optimized internal instruction to be stored as a single instruction, and the optimized internal instruction is executed by generating the first and second internal instructions and executing the first and second internal instructions separately, such as in separate operation cycles.

In yet another embodiment, the first and second internal instructions are executed in blocks 35 and 36 by executing the optimized internal instruction twice, where the optimized internal instruction includes a first internal instruction portion corresponding to the first internal instruction and a second internal instruction portion corresponding to the second internal instruction. In this embodiment, the first internal instruction portion is executed the first time the optimized internal instruction is executed, and the second internal instruction portion is executed the second time the optimized internal instruction is executed.

In yet another embodiment, the first and second internal instructions are executed in blocks 35 and 36 by executing the optimized internal instruction once instead of generating two separate internal instructions. In this embodiment, the optimized internal instruction includes a first internal instruction portion corresponding to the first internal instruction and a second internal instruction portion corresponding to the second internal instruction, and the second internal instruction portion is executed immediately after the first internal instruction portion without generating separate internal instructions.

Embodiments of the present disclosure encompass any instruction set architecture, including reduced instruction set computing (RISC) and complex instruction set computing (CISC). For example, in embodiments related to a RISC architecture, the first instruction may be a load instruction, and the second instruction may be a data processing operation to act on a result of the first instruction, such as an arithmetic instruction. On the other hand, in embodiments related to a CISC architecture, the first instruction may be any instruction type, including an arithmetic instruction, and the second instruction may be any instruction type, including an arithmetic instruction.

Figure 5:
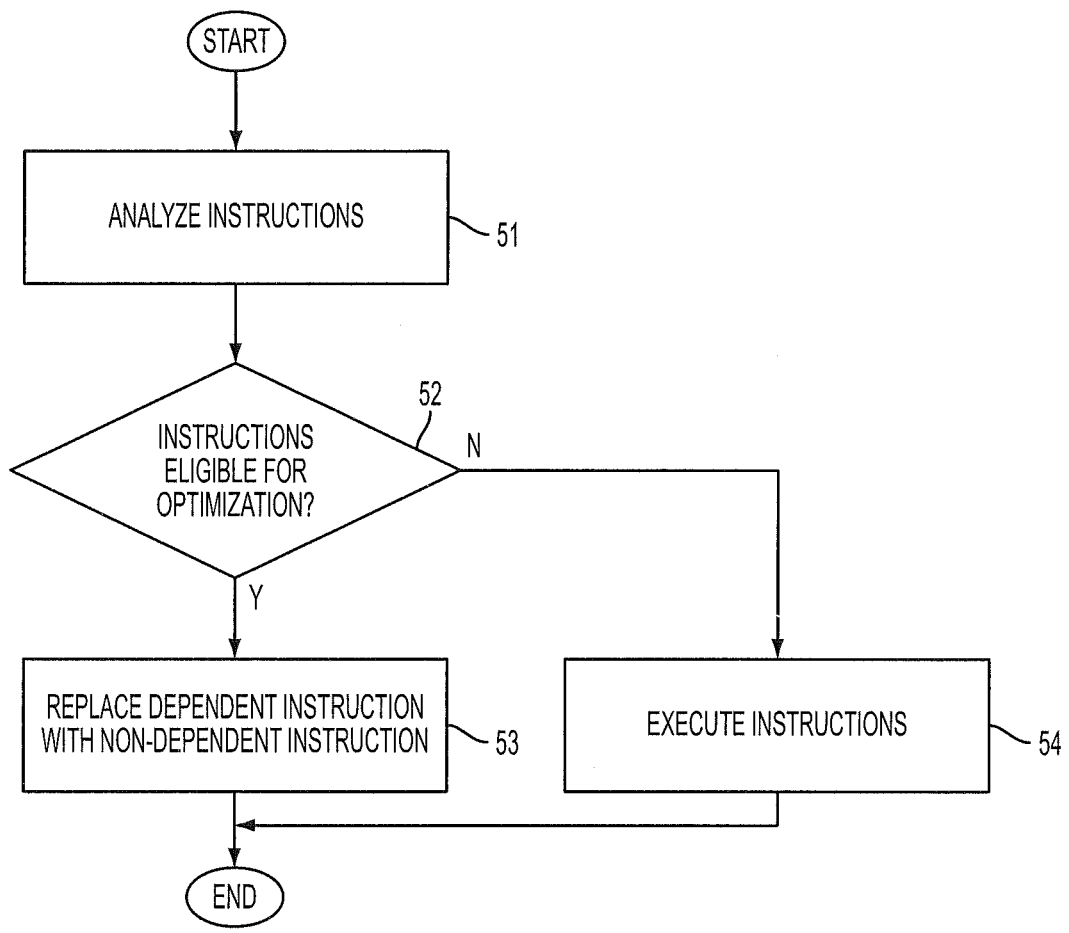
FIG. 5 depicts a process flow for optimizing instructions according to another embodiment of the present disclosure.

FIG. 5 illustrates a process of optimizing instructions according to another embodiment of the present disclosure. In block 51, two or more instructions are analyzed. In particular, a target destination of a first instruction may be detected and an operand source location of a second instruction to be executed directly after the first instruction may be detected. In block 52, it may be determined whether the target destination of the first instruction is the same as the operand source location of the second instruction, or in other words, whether the second instruction is dependent upon the first instruction.

If it is determined in block 52 that the second instruction is dependent on the first instruction, then in block 53, the second instruction may be removed from a position in an instruction stream directly following the first instruction, and a non-dependent instruction may replace the second instruction. For example, in an embodiment in which a stream of internal instructions is arranged in a queue, and an instruction at the front of the queue is fetched by a processor for execution, the second instruction that is dependent on the first instruction may be removed from a position in the queue directly following the first instruction. In its place, another instruction from downstream in the queue, or from another location in memory, may be inserted into a position in the queue following the first instruction.

On the other hand, if it is determined in block 52 that the second instruction is not dependent on the first instruction, then the instructions may execute in order in block 54. Accordingly, in embodiments of the present disclosure, instructions may be arranged so that adjacent instructions may be executed in parallel by a processor.

Referring again to FIG. 1, the system 1 may further include one or more loop buffers 11 to store internal instructions identified as corresponding to internal instruction loops by the processor 15. In embodiments of the present disclosure, the loop buffer 11 may store one or more optimized internal instructions 23. The processor 15 may select one of the loop buffer 11 and the internal instruction cache 12 as a source for an internal instruction. For example, in one embodiment in which the processor 15 recognizes a next instruction as corresponding to an internal instruction in the loop buffer 11, the processor 15 may select the loop buffer 11 as the internal instruction source rather than the instruction cache 12. In one embodiment, the system 1 may include a multiplexer, and the processor 15 may control the multiplexer to control whether an internal instruction is fetched from the instruction cache 12 or the loop buffer 11.

Figure 6:
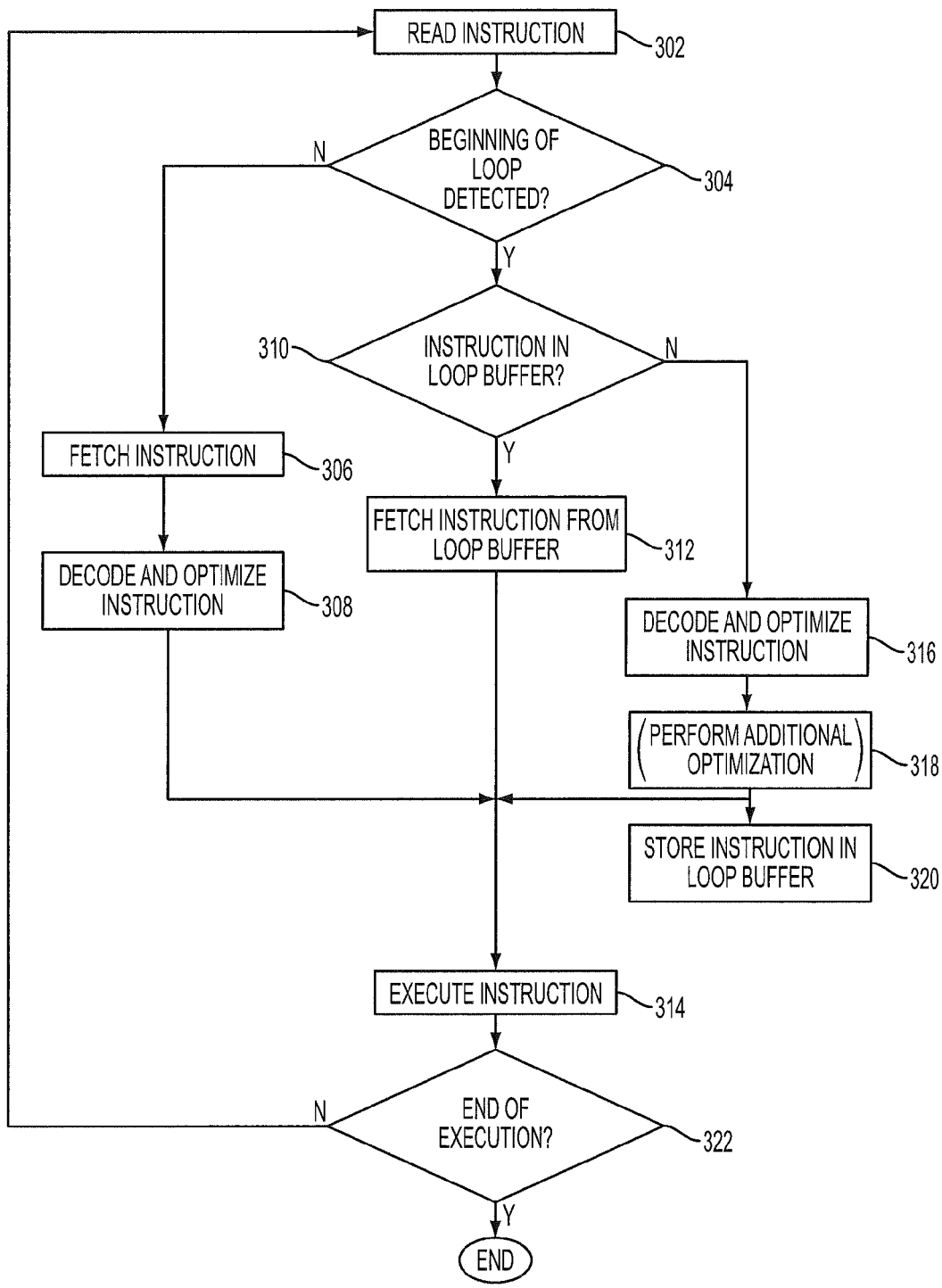
FIG. 6 depicts a process flow for caching optimized internal instructions according to an embodiment of the present disclosure.

FIG. 6 depicts a process flow for caching optimized internal instructions according to an embodiment of the present disclosure. In block 302, an instruction is read by the processor 15. For example, the fetch unit 18 may determine a next instruction to be fetched. In block 304, it is determined whether the next instruction to be fetched is a beginning of an instruction loop. If it is determined in block 304 that the instruction is not the beginning of an instruction loop, the instruction is fetched in block 306. For example, the fetch unit 18 of the processor 15 may fetch the next instruction from the instruction cache 12, the decoder 17 may decode the instruction in block 308, and the execution unit 16 may execute a resulting internal instruction in block 314.

If it is determined in block 304 that the next instruction to be fetched is the beginning of an instruction loop, then in block 310 it is determined whether an internal instruction loop corresponding to the detected instruction loop is located in the loop buffer 11. If it is determined that the internal instruction loop is located in the loop buffer 11, then in block 312 the fetch unit 18 may fetch the internal instruction loop from the loop buffer 11, and in block 314 the execution unit 16 may execute the internal instruction loop.

If it is determined in block 310 that a corresponding internal instruction loop is not located in the loop buffer 11, then in block 316 the decoder 17 may decode the instruction loop, and the optimizer 19 may determine whether one or more instructions of the instruction loop are eligible for optimization and may optimize the eligible instructions of the instruction loop. In block 318, it may be determined whether additional optimization may occur. For example, additional optimization may include merging multiple optimized internal instructions of an instruction loop. In block 320, the decoded and optimized internal instruction loop may be stored in the loop buffer 11, and in block 314, the execution unit 16 may execute the decoded and optimized internal instruction.

In one embodiment of the present disclosure, the internal instruction loop may be stored in the loop buffer at block 320 simultaneously as the internal instruction loop being executed at block 314. In other embodiments, the internal instruction loop may be stored in the loop buffer before the internal instruction loop is executed, or the internal instruction loop may be executed prior to storing the internal instruction loop in the loop buffer. In other embodiments, additional optimization may be performed (block 318) at the same time the internal instruction loop is being executed in block 314.

In block 322, it is determined whether the execution of internal instruction loop is completed. If more instructions remain to be executed, the next instruction is read in block 302.

According to the above embodiment, an instruction may be optimized, and the optimized internal instruction loop may be stored in a loop buffer. Consequently, the optimized internal instructions of an internal instruction loop need not be re-optimized each time the internal instruction loop is fetched or the loop including the optimized internal instruction is executed.

In embodiments of the present disclosure, a fetched instruction may be either a machine instruction or an internal instruction based on the machine instruction. A processor may optimize two or more machine instructions to generate an optimized internal instruction, or the processor may optimize two or more internal instructions to generate an optimized internal instruction.

Figure 7:
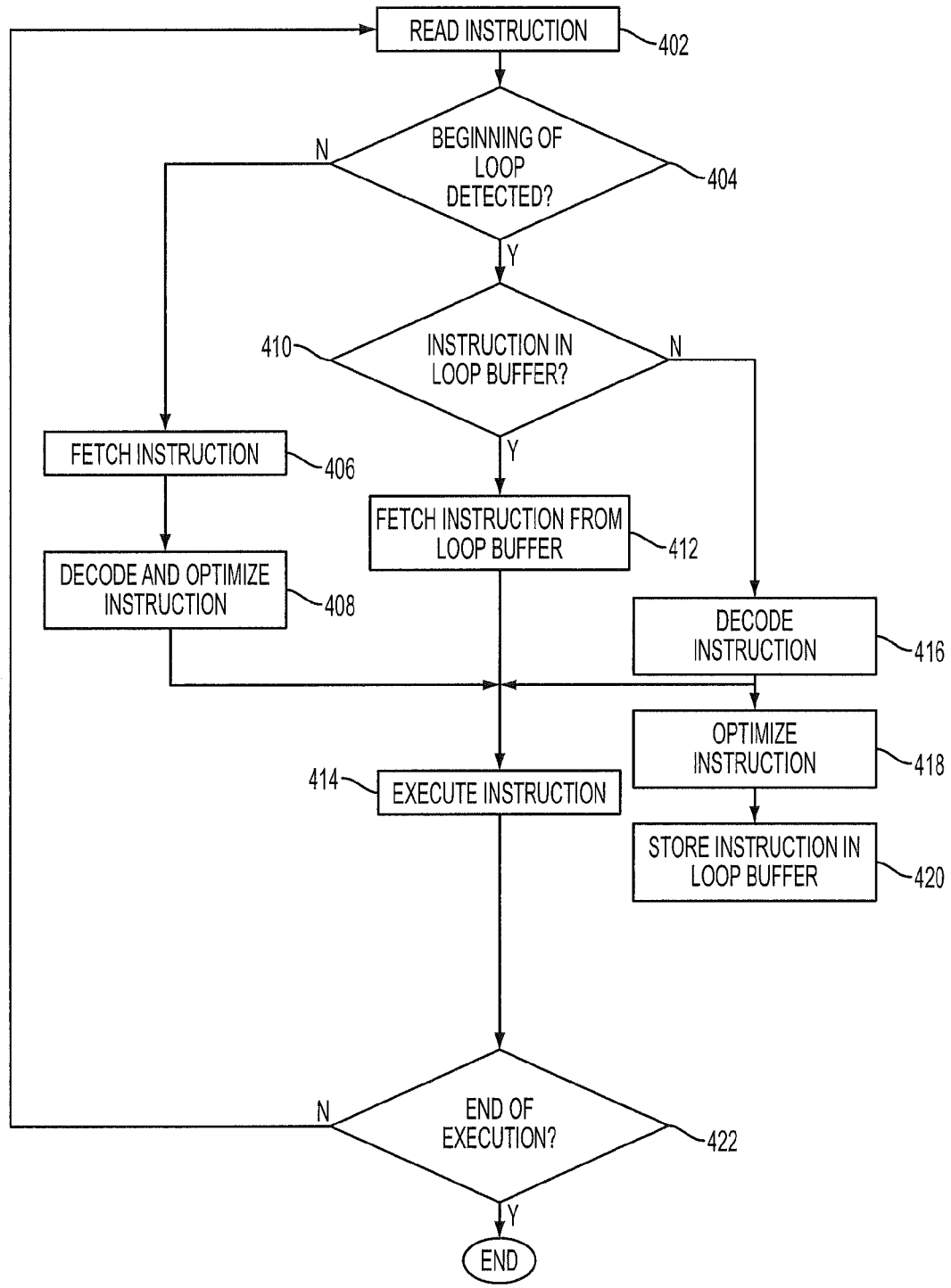
FIG. 7 depicts a process flow for caching optimized internal instructions according to another embodiment of the present disclosure.

FIG. 7 depicts a process flow for caching optimized internal instructions according to another embodiment of the present disclosure. In operation 402, an instruction is read by the processor 15. The instruction may be a machine instruction or an internal instruction derived from the machine instruction. For example, the fetch unit 18 may determine a next instruction to be fetched. In operation 404, it is determined whether the next instruction to be fetched is a beginning of an instruction loop. If it is determined in operation 404 that the instruction is not the beginning of an instruction loop, the instruction is fetched in operation 406. For example, the fetch unit 18 of the processor 15 may fetch the next instruction from the instruction cache 12, the decoder 17 may decode the instruction in operation 408, and the execution unit 16 may execute a corresponding internal instruction in operation 414.

If it is determined in operation 404 that the next instruction to be fetched is the beginning of an instruction loop, then in operation 410 it is determined whether a corresponding internal instruction is located in the loop buffer 11. If it is determined that the internal instruction loop is located in the loop buffer 11, then in operation 412 the fetch unit 18 may fetch the internal instruction loop from the loop buffer 11, and in operation 414 the execution unit 16 may execute the internal instruction loop.

If it is determined in operation 410 that the internal instruction loop is not located in the loop buffer 11, then in operation 416 the decoder 17 may decode the instruction loop. In operations 418 and 414, the processor may simultaneously optimize the decoded internal instruction loop (operation 418) while executing the decoded internal instruction loop (operation 414).

In operation 420, the decoded and optimized internal instruction loop may be stored in the loop buffer 11. In operation 322, it is determined whether the execution of internal instruction loop is completed. If more instructions remain to be executed, the next instruction is read in operation 402.

According to the embodiment depicted in FIG. 4 an efficiency of a processor 15 may be increased by simultaneously optimizing an instruction and executing a corresponding internal instruction when it is determined that the optimized internal instruction is not located in the loop buffer 11. Once the internal instruction loop is optimized by optimizing two or more instructions of the internal instruction loop, the optimized instruction loop may be stored in the loop buffer 11 to be accessed a next time the instruction loop is to be executed.

Figure 8:
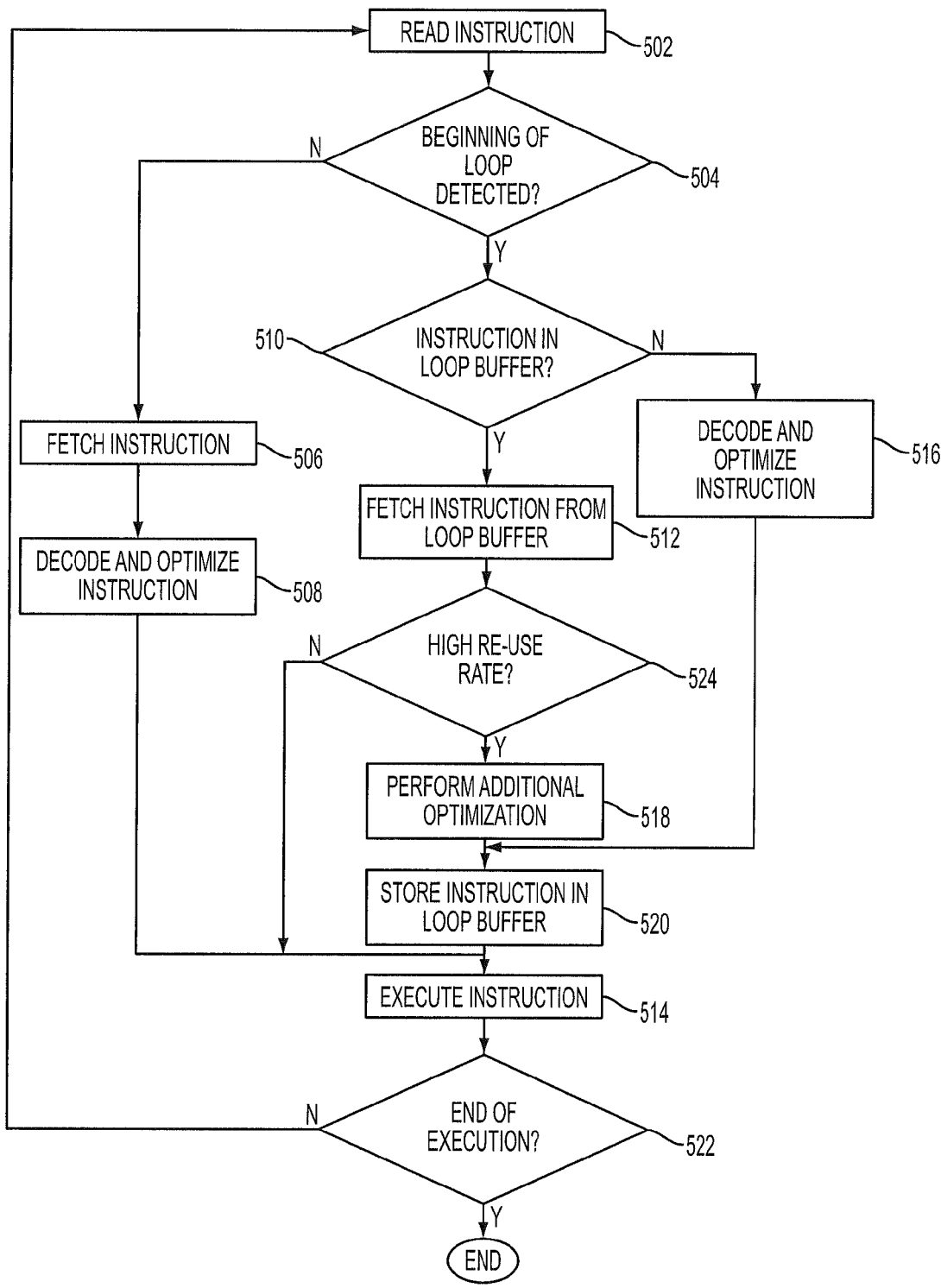
FIG. 8 depicts a process flow for caching optimized internal instructions according to another embodiment of the present disclosure.

FIG. 8 depicts a process flow for caching optimized internal instructions according to another embodiment of the present disclosure. In operation 502, an instruction is read by the processor 15. For example, the fetch unit 18 may determine a next instruction to be fetched. In operation 504, it is determined whether the next instruction to be fetched is a beginning of an instruction loop. If it is determined in operation 504 that the instruction is not the beginning of an instruction loop, the instruction is fetched in operation 506. For example, the fetch unit 18 of the processor 15 may fetch the next instruction from the instruction cache 12, the decoder 17 may decode the instruction in operation 508, and the execution unit 16 may execute a corresponding internal instruction in operation 514.

If it is determined in operation 504 that the next instruction to be fetched is the beginning of an instruction loop, then in operation 510 it is determined whether a corresponding internal instruction loop is located in the loop buffer 11. If it is determined that the internal instruction loop is located in the loop buffer 11, then in operation 512 the fetch unit 18 may fetch the internal instruction loop from the loop buffer 11. In operation 524, it may be determined whether the internal instruction loop has a high re-use rate. For example, it may be determined whether the internal instruction loop has been accessed more than a predetermined number of times, such as 10,000 times, 100,000 times, or 1,000,000 times. In one embodiment, the processor 15 determines whether the internal instruction loop has a high re-use rate.

When it is determined that the internal instruction loop has a high re-use rate, then in operation 518 additional optimization may be performed to further optimize the internal instruction loop. For example, additional optimization may include merging multiple optimized internal instructions of the internal instruction loop. In operation 520, the optimized internal instruction loop may be stored in the loop buffer 11, and in operation 514, the internal instruction may be executed by the execution unit 16.

If it is determined in operation 510 that a corresponding internal instruction loop is not located in the loop buffer 11, then in operation 516 the decoder 17 may decode the instruction loop, and the optimizer 19 may determine whether the internal instruction is eligible for optimization and may optimize the internal instruction. In operation 520, the internal instruction loop may be stored in the loop buffer 11, and in operation 514, the execution unit 514 may execute the internal instruction.

In operation 522, it is determined whether the execution of the internal instruction loop is completed. If more internal instructions remain to be executed, the next internal instruction is read in operation 502.

Figure 9:
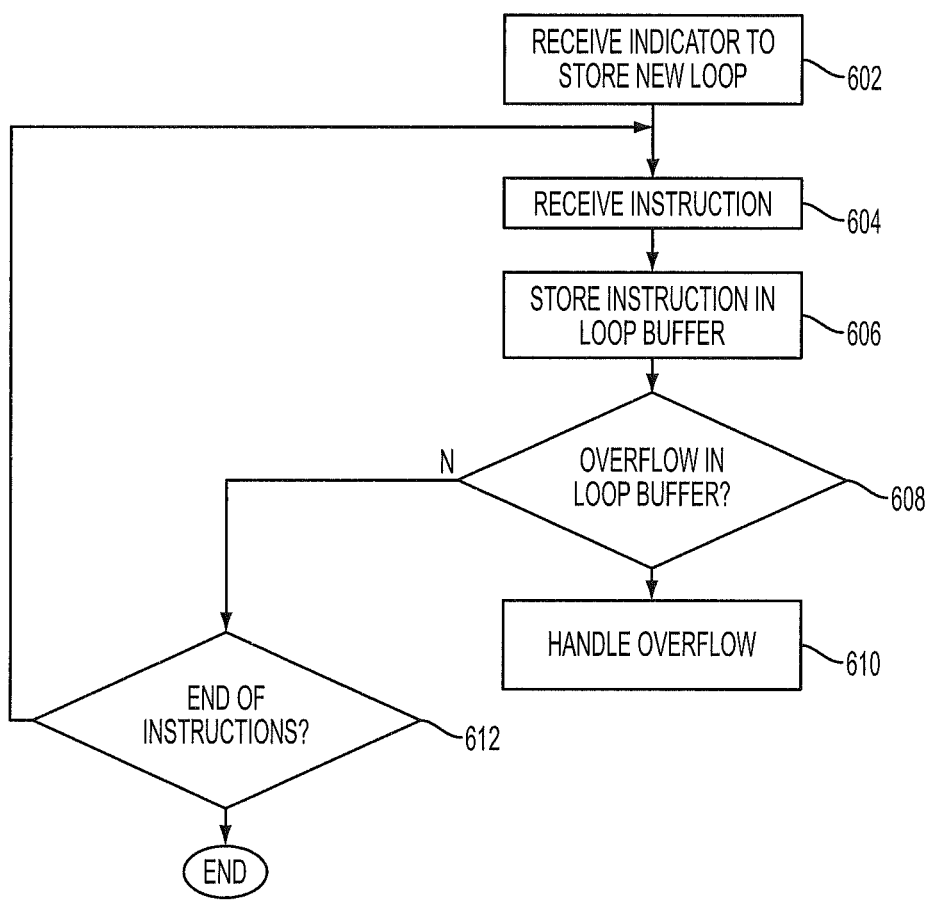
FIG. 9 depicts a process flow for caching optimized internal instructions according to another embodiment of the present disclosure.

FIG. 9 depicts a process flow for caching optimized internal instructions according to another embodiment of the present disclosure. In operation 602, the processor 602 may receive an indicator that a received internal instruction is a new loop to be stored in the loop buffer 11. The indicator may include at least one of a flag, content within an internal instruction, such as operand data, address data, data type information, internal instruction type information, or other information corresponding to an internal instruction to identify the internal instruction as an internal instruction loop. The indicator may be detected, for example, in operation 310, 410, or 510 to determine whether to store a new loop or retrieve loop instructions from a loop buffer 11.

In operation 604, the internal instruction corresponding to the loop indicator is received. In operation 606, the internal instruction is stored in a loop buffer 11. In operation 608, it may be determined whether an overflow exists in the loop buffer 11. In particular, it may be determined whether a data size of the received internal instruction exceeds a data size remaining in the loop buffer 11. If an overflow exists in the loop buffer 11, the overflow may be handled in operation 610. In one embodiment, a portion of the received internal instruction may be saved in the loop buffer 11, and an indicator may be generated, such as a pointer, flag, or other indicator, to indicate to the processor that additional internal instruction information exists. In another embodiment, the internal instruction is not input to the loop buffer 11, or a portion of the internal instruction previously input to the loop buffer 11 is removed from the loop buffer 11. In one embodiment, when internal instructions are removed from a loop buffer due to overflow, overflowing loops are not stored in loop buffers. In another embodiment, the initial portion of a loop is stored in a loop buffer, and normal internal instruction fetch from a cache resumes when the end (overflow point) of the loop buffer is reached.

In yet another embodiment, the size of the loop buffer 11 may be increased. For example, if the loop buffer 11 is located in cache memory, then additional space in the cache memory may be allotted to the loop buffer 11. In another embodiment in accordance with the present disclosure, another loop buffer is allocated to store the overflow.

In operation 612, it may be determined whether the internal instructions are at an end. If not, a next internal instruction is received in operation 604.

Figure 10:
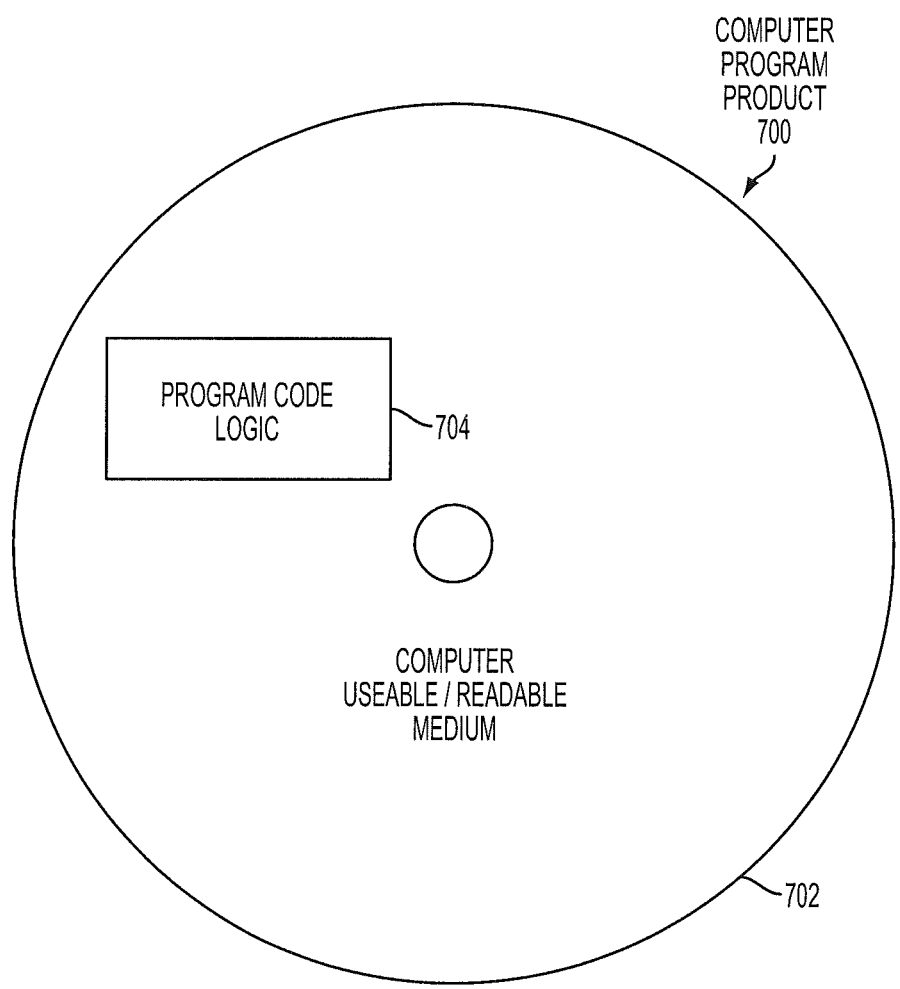
FIG. 10 depicts a computer program product in accordance with one embodiment.

As described above, embodiments can be embodied in the form of computer-implemented processes and apparatuses for practicing those processes. An embodiment may include a computer program product 700 as depicted in FIG. 10 on a computer readable/usable medium 702 with computer program code logic 704 containing instructions embodied in tangible media as an article of manufacture. Exemplary articles of manufacture for computer readable/usable medium 702 may include floppy diskettes, CD-ROMs, hard drives, universal serial bus (USB) flash drives, or any other computer-readable storage medium, wherein, when the computer program code logic 704 is loaded into and executed by a computer, the computer becomes an apparatus for practicing the invention. Embodiments include computer program code logic 704, for example, whether stored in a storage medium, loaded into and/or executed by a computer, or transmitted over some transmission medium, such as over electrical wiring or cabling, through fiber optics, or via electromagnetic radiation, wherein, when the computer program code logic 704 is loaded into and executed by a computer, the computer becomes an apparatus for practicing the invention. When implemented on a general-purpose microprocessor, the computer program code logic 704 segments configure the microprocessor to create specific logic circuits.

Technical effects and benefits of embodiments of the present disclosure include increasing processor efficiency by storing in loop buffers internal instruction loops having optimized instructions, which alleviates the need for the processor to re-optimize instructions each time the loop including the instructions is executed. In particular, technical benefits include increasing processor efficiency in systems in which one instruction depends from a previous instruction in a stream of instructions. Other technical effects and benefits may result from systems, methods, and computer program products according to embodiments of the present disclosure, and the scope of the invention is not limited to any one of the above effects or benefits.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The above embodiments were chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for storing an internal instruction loop in a loop buffer, the computer system comprising:
   a loop buffer configured to store a plurality of internal instruction loops; and
   a processor,
   the computer system configured to perform a method comprising:
      fetching instructions from memory to generate internal instructions to be executed by the processor;
      detecting, by the processor, a beginning of a first instruction loop in the instructions;
      determining that a first optimized internal instruction loop corresponding to the first instruction loop is not stored in the loop buffer;
      fetching the first instruction loop;
      optimizing, by the processor, one or more instructions corresponding to the first instruction loop to generate a first optimized internal instruction loop;
      storing the first optimized internal instruction loop in the loop buffer based on the determination that the first optimized internal instruction loop is not stored in the loop buffer, wherein the optimizing and storing are performed prior to executing the first instruction loop;
      detecting a beginning of a second instruction loop in the instructions;
      determining that a second optimized internal instruction loop corresponding to the second internal instruction loop is stored in the loop buffer, the second optimized internal instruction loop decoded and optimized; and
      based on determining that the second optimized internal instruction loop corresponding to the second internal instruction loop is stored in the loop buffer, fetching the second optimized instruction loop from the loop buffer, and executing the second and optimized instruction loop.

2. The computer system of claim 1, wherein the optimizing includes merging two or more machine instructions into a single optimized internal instruction.

3. The computer system of claim 2, wherein the computer system is further configured to perform:
   executing the single optimized internal instruction two or more times to execute each of the two or more internal instructions of the single optimized internal instruction.

4. The computer system of claim 1, wherein the processor comprises an optimizer configured to optimize the one or more internal instructions by:
   determining that a second instruction of the one or more instructions is configured to be executed sequentially after the first instruction;
   determining that the first instruction specifies a target operand location;
   determining that the second instruction specifies a source operand location that is the same as the target operand location of the first instruction; and
   replacing in an execution sequence, by the processor, the second instruction with a third internal instruction that has a source operand location different from the target operand location of the first instruction.

5. The computer system of claim 1, wherein the method further comprises:
   determining that the optimized instruction loop stored in the loop buffer has at least a predetermined re-use rate;
   optimizing one or more instructions of the optimized instruction loop to generate a third optimized internal instruction loop; and storing the third optimized internal instruction loop in the loop buffer.

6. The computer system of claim 1, wherein optimizing, by the processor, the one or more instructions includes determining whether at least one of an operand location and a destination of a second instruction is the same as a destination of the first instruction, the second instruction configured to be executed sequentially after the first instruction.

7. The computer system of claim 1, wherein the method further comprises:
   determining that a size of the first optimized internal instruction loop overflows the loop buffer;
   storing a portion of the first optimized internal instruction loop in the loop buffer; and
   fetching from an internal instruction cache a portion of the first optimized internal instruction loop that is not stored in the loop buffer.

8. The computer system of claim 1, further comprising:
   determining that a size of the first optimized internal instruction loop overflows the loop buffer;
   allocating at least one additional loop buffer based on the determination that the size of the first optimized internal instruction loop overflows the loop buffer; and
   storing the first optimized internal instruction in the at least one additional loop buffer.

* * * * *